United States Patent [19]

Etoh

[11] Patent Number: 5,519,789
[45] Date of Patent: May 21, 1996

[54] IMAGE CLUSTERING APPARATUS

[75] Inventor: Minoru Etoh, Katano, Japan

[73] Assignee: Matsushita Electric Industrial Co., Ltd., Osaka, Japan

[21] Appl. No.: 141,073

[22] Filed: Oct. 26, 1993

[30] Foreign Application Priority Data

Nov. 4, 1992 [JP] Japan ................................. 4-294837

[51] Int. Cl.$^6$ .................................................. G06K 9/36
[52] U.S. Cl. ............................................................ 382/225
[58] Field of Search ................................ 382/9, 36, 39, 382/225, 228, 173

[56] References Cited

U.S. PATENT DOCUMENTS 4,945,478  7/1990  Merickel et al. .......................... 382/6

OTHER PUBLICATIONS

Kelly et al. "An Adaptive Algorithmn for Modifying Hyperellipsoidal Decision Surfaces". IJCNN Int. Joint Conf. on Neural Net., Jun. 1992, vol. 4, 196–201.

Fukunaga, *Introduction to Statistical Patter Recognition,* Academic Press, Inc. 1990, 508–532.

Pappas, "An Adaptive Clustering Algorithm for Image Segmentation" *IEEE Trans. on Sig. Proc.* vol. 40, Iss. 4, 901–914.

Gregoriou et al. "Unsupervised Textured Image Segmentation" 1992 IEEE Int. Conf. Acoustics, Speech, Sig. Proc., Mar. 1992, vol. 3, 73–76.

*Computer Vision—ECCV '92, Second European Conference on Computer Vision Proceedings, Santa Margherita Ligure, Italy, May 19–22, 1993 Proceedings,* Jun. 18, 1992, "Contour Extraction by Mixture Density Description Obtained from Region Clustering," Etoh, et al. pp. 24–32.

*1st International Symposium on Medical Imaging and Image Interpretation ISMIII '82,* Oct. 26, 1982, Berlin, Germany, "A Segmentation Method for Cell Image Based on Two-Dimensional Histogram," Yoshio Noguchi, pp. 134–139.

*Primary Examiner*—Michael T. Razavi
*Assistant Examiner*—Jon Chang
*Attorney, Agent, or Firm*—Beveridge, DeGrandi, Weilacher & Young

[57] ABSTRACT

For determining class mean and covariance in class so as to make distribution parameters of pixels express statistical properties of the object, and for clustering the image stably at high speed, the apparatus has: (a) frame memory storing image composed of coded pixels, (b) reading device for reading out values of pixels randomly about horizontal and vertical positions from the frame memory, and generating a sample vector containing coupling of read out pixels values and corresponding horizontal and vertical position data, (c) memory for holding a plurality of sets of covariance matrix and mean vector of sample vector as class data, (d) likelihood calculating circuit calculating likelihood of sample vector to plural sets of class data as the distance between sample classes which is sum of a distance obtained by normalizing difference of sample vector and mean vector by covariance matrix, and a magnitude of covariance matrix, (e) maximum likelihood class selecting device selecting set minimizing distance between sample classes among combinations of class data, and (f) class data changing device sequentially changing mean vector and covariance matrix composing class data in direction of reducing distance between sample classes, by using difference vector of sample vector and mean vector.

3 Claims, 7 Drawing Sheets

Fig. 3
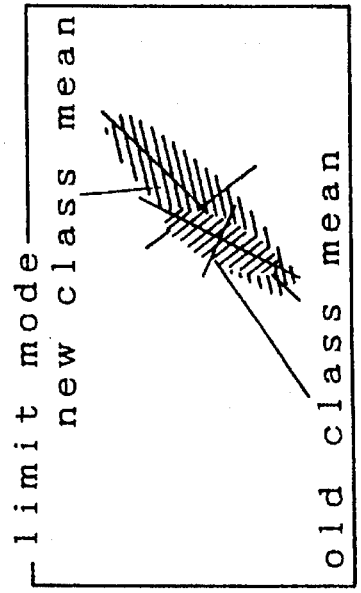
limit mode
new class mean
old class mean
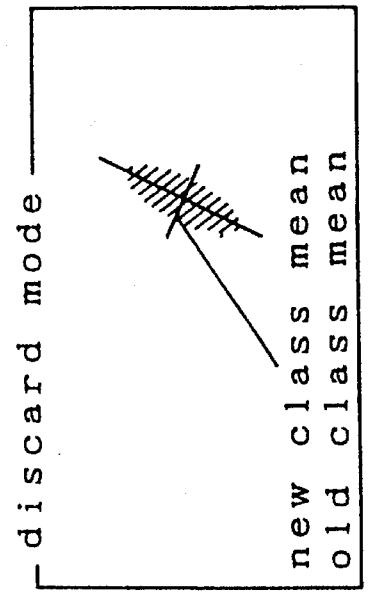
discard mode
new class mean
old class mean
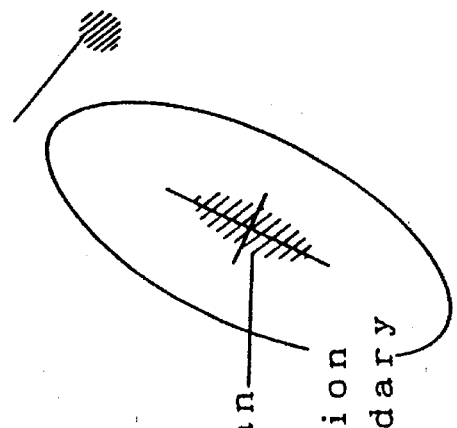
sample vector
class mean
chi-square distribution critical region boundary
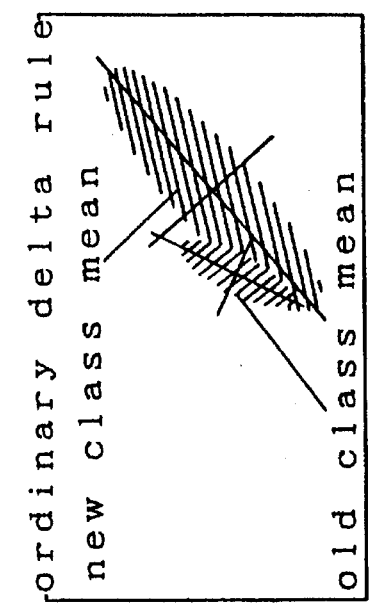
ordinary delta rule
new class mean
old class mean

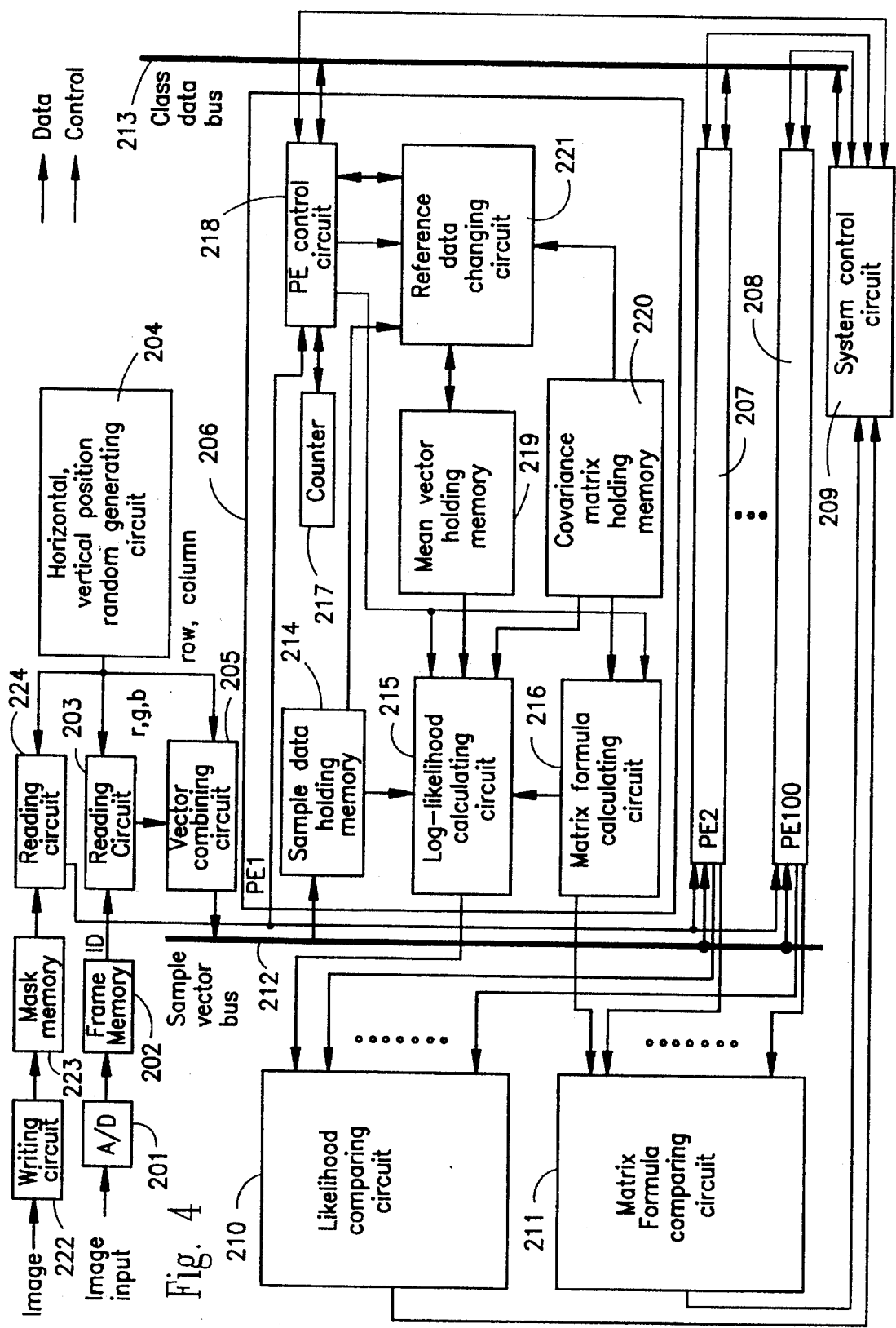

Fig. 5. ID0 background area
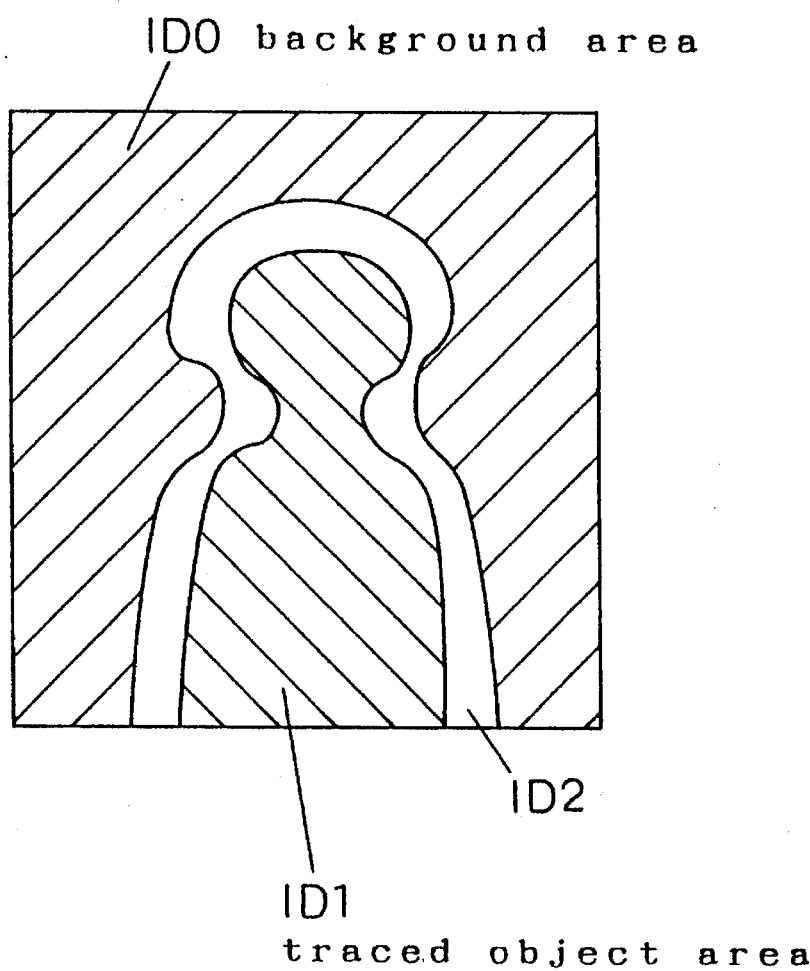
ID2
ID1
traced object area
Fig. 6
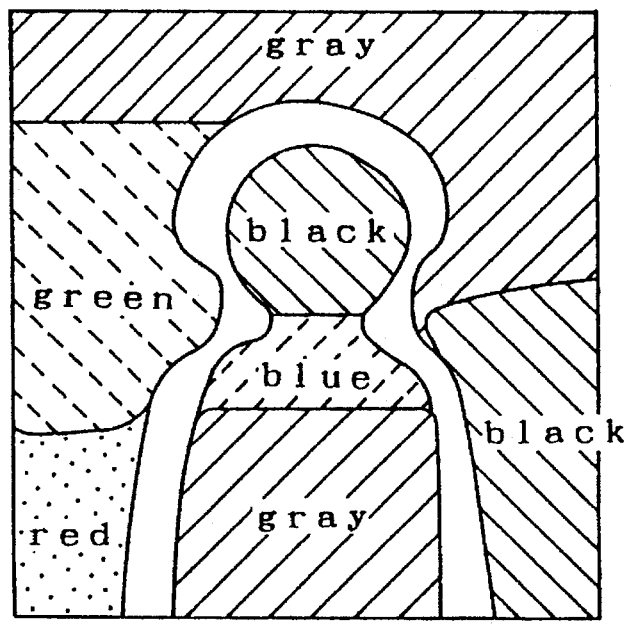

IMAGE CLUSTERING APPARATUS

BACKGROUND OF THE INVENTION

1. Field of the Invention

The present invention relates to an image clustering apparatus for processing of region division, object tracing in image, etc. necessary for high efficiency coding of image, noise reduction, combining and editing, and the like.

2. Related Art of the Invention

Concerning the image clustering technique of dividing the region by finding sets of similar image data from images, a first prior art is disclosed by Nobuaki Izumi, Hiroyuki Morikawa, and Hiroshi Harashima in "A study on segmentation technique combining color information and position information," General Meeting of Japan Society of Electronic Information and Communications, spring 1991, Vol. 7, p. 392, Lecture No. D-680.

It is intended to cluster and divide the image by the K-mean clustering used in creating reference vector by vector quantizer from the image data.

Processing of the K-mean clustering technique is carried out by the repetition of the following three steps.

Step 1) n class means are properly determined.

Step 2) Each element of sample sets is assigned to the class having the class mean of the shortest distance.

Step 3) In each class, the mean of the assigned sample sets is calculated to obtain a new class mean. In this example, the feature vector is combined with the horizontal position and vertical position on the image of the pixel, in addition to three-dimensional vector of RGB color to make up a five-dimensional configuration, and the distance is calculated as shown in formula (1).

$$\sqrt{K_s\{(r-\bar{r})^2 + (g-\bar{g})^2 + (b-\bar{b})^2\} + K_1\{(x-\bar{x})^2 + (y-\bar{y})^2\}} \quad (1)$$

where r, g, b, x, y are elements of samples, and $\bar{r}$, $\bar{g}$, $\bar{b}$, $\bar{x}$, $\bar{y}$ are elements of RGB colors and horizontal and vertical positions of the class mean. In image segmentation by conventional clustering used before the first prior art, the spatial continuity on the image was not taken into consideration, and the divisions obtained involved "salt and pepper" (for example, Haralick, R. and Shapiro, L.: "SURVEY: Image Segmenta-tion Techniques," Computer Vision Graphics, and Image processing, Vol. 29, pp. 100–132, 1985). By contrast, in the first prior art, because of clustering by adding horizontal and vertical positions, the neighboring pixels on the image were collected on the same cluster, and relatively continuous regions are obtained.

A second prior art similar to the first prior art was disclosed by Crisman, J. and Thorpe, C. in "UNSCARF, A Color Vision System for the Detection of Unstructured Roads," Proc. 1991 IEEE Int. Conf. on Robotics and Automation, pp. 2496–2501 (1991). In this paper, formula (2) is used as the function of distance $$(x-u_i)^t C_i'^{-1} (x-u_i) \quad (2)$$

where x is a feature vector of which row vector is (r, g, b, x, y)$^t$, and $u_i$ is the mean of the i-th class data. ( )$^t$ denotes transposition of matrix. C' is a covariance matrix normalized so that the value of the matrix formula may be 1, and it is normalized, as shown in formula (5), by the fifth power root ||C|| of the matrix formula. If the inverse matrix of covariance matrix is used in formula (2) without being normalized, all samples may be assigned into one large class. Normalization is used to avoid this.

$$C_i' = \frac{C_i}{\|C_i\|} \quad (3)$$

The covariance matrix can be directly determined by using assigned samples, in the same manner as when determining the class mean, at step 3 of the K-mean method. In the second prior art, too, the same effect as in the first prior art can be obtained.

The present invention is intended to solve the following problems.

1) In the first prior art, the result of clustering differs depending on the constants Ks and $K_l$ in formula (1). These Ks and $K_l$ constants should be determined automatically depending on luminance changes. It seems, moreover, difficult to set the coefficients if the sample vectors including the differential value and luminance value of infrared waveforms are assumed as features of other pixels. In the second prior art, by normalizing the covariance matrix, weighting about the distance calculation between sample vector and class mean is automated. However, in the method of using the normalized covariance matrix, formula (2) does not represent the statistically normalized distance (Mahalanobis distance), and it does not seem to reflect the physical meaning of the object. In the insulated object illuminated by a single light source, it is known that its luminance distributes on a plane of multidimensional spectrum (for example, RGB space) (for example, Healey, G.: "Segmenting Images Using Normalized Color," IEEE Transaction on Systems, Man, and Cybernetics, Vol. 22, No. 1, pp. 64–75, January, 1992). If the variance of distance from this plane is intrinsic in the object and imaging system, the corrected covariance matrix is inappropriate.

2) In both the first and second prior arts, the K-mean clustering or a similar method (ISODATA) is employed for determining cluster data. It therefore requires memory for holding samples, and the cluster data requires repetition of step 1 to step 3, hence it is difficult to apply in an image with slowly changing data.

3) In the first and second prior arts, there is no teaching information for defining the result of clustering, or concerning image clustering.

However, in image clustering, in many applications, the boundary of the object is given preliminarily about a certain image, and then corresponding boundaries are determined for similar images. In clustering by K-mean method, when the assignment of sample vector is found to be wrong, the method of changing the class data dynamically for this "negative" sample is not known.

Concerning 2), generally, a self-organizing map developed by Kohonen is a known technique for sequentially changing the class data when obtaining class data of vectors having similar features from feature vector sets (for example, Kohonen, T: "The Self-Organizing Map," Proceedings of the IEEE, Vol. 78, No. 9, 1990). More specifically, by operating a processing element, called a neuron, which holds class data and calculates distance, the class data of the smallest neuron among the distance calculations conducted by neurons is changed into a rule called delta rule. As a result, each neuron possesses cluster data. Evidently, the distance calculation by this self-organizing processing technique can be set parallel similar to the processing by K-mean clustering. Advantages of the self-organizing processing are that class data are sequentially obtained, and that memory is not required for holding sample data.

The self-organizing process by Kohonen is the process of operating only the class mean, by regarding the Euclidean distance as the clustering scale. Therefore, it cannot be applied for the purpose of incorporating the covariance as class data. Relating to 3), similarly, the learning vector quantization is reported in the cited reference of Kohonen.

If there is a certain set of sample vector for learning, and the sample vector is assigned to wrong class data, by changing the class mean so as to be far from the negative sample vector, assignment to undesired class data may be decreased. In this problem, too, however, the learning vector quantization of Kohonen is the processing of operating only the class mean, using the Euclidean distance as the clustering scale. Therefore, it cannot be applied for the purpose of obtaining the covariance as class data.

Summary

To solve the above problems, it is a primary object of this invention to present an image clustering apparatus for determining a class mean and covariance in the class so as to make the distribution parameters of pixels expressing the statistical properties of the object, and clustering the image stably at high speed. It is another object of the invention to present an image clustering apparatus for determining the class mean and covariance in the class reflecting the structure of teaching information if there is any teaching information about the segmentation of an image.

An image clustering apparatus of the first embodiment of the present invention concerns the case where there is no teaching information about the segmentation of an image, such an apparatus comprises:

(a) a frame memory for storing an image composed of coded pixels, (b) reading means for randomly reading out values of pixels about horizontal position and vertical position on the image from the frame memory, and generating a sample vector containing coupling of the read out pixels' values and the corresponding horizontal and vertical positions, (c) a memory for holding a plurality of sets of covariance matrix and mean vector data of the sample vector as class data, (d) likelihood calculating means for calculating a likelihood of the sample vector being included in the plural sets of class data based on a distance between sample classes which is a sum of;

a distance obtained by normalizing a difference of the sample vector and the mean vector by the covariance matrix, and a magnitude of the covariance matrix, (e) maximum likelihood class selecting means for selecting a set in which the distance between sample classes among combinations of the class data is minimal, and (f) class data changing means for changing the mean vector and covariance matrix composing the class data in a direction which reduces the distance between sample classes, by using the difference vector of the sample vector and mean vector.

An image clustering apparatus of the second embodiment of the present invention concerns the case where there is teaching information about the segmentation of an image, such an apparatus comprises:

(a) a frame memory for storing an image composed of coded pixels, (b) reading means for randomly reading out values of pixels about horizontal position and vertical position on the image from the frame memory, and generating a sample vector containing coupling of the read out pixels' values and the corresponding horizontal and vertical positions, (c) a memory for holding a plurality of sets of covariance matrix and mean vector data of the sample vector as class data, (d) likelihood calculating means for calculating a likelihood of the sample vector being included the plural sets of class data based on a distance between sample classes which is a sum of;

a distance obtained by normalizing a difference of the sample vector and the mean vector by the covariance matrix, and a magnitude of the covariance matrix, (e) maximum likelihood class selecting means for selecting a set in which the distance between sample classes among combinations of the class data is minimal, and (f) teaching means for judging the correctness of class data and for minimizing the normalized distance among combinations of the class data, and (g) class data changing means for:

changing the mean vector and covariance matrix composing the class data after input of the sample vector in a direction which reduces the distance between sample classes, when judged to be correct by the teaching means, and changing the mean vector and covariance matrix composing the class data in a direction to increase the distance between sample classes by using the difference vector of the sample vector and mean vector, when judged to be incorrect by the teaching means.

According to the first embodiment, the reading means randomly reads out the pixel values at a horizontal position and vertical position on the image from the frame memory, so that convergence into biased class data is avoided. The reading means also generates sample vectors containing a coupling of a feature value of the pixel and the corresponding horizontal and vertical positions. By producing the sample vector coupling the horizontal and vertical positions, the neighboring pixels on the image belong to a same class. Consequently, for the sample vector being read out, the likelihood calculating means calculates the likelihood of inclusion in the plural class data.

The likelihood is evaluated to be high when the distance of adding the magnitude of the covariance matrix to the distance normalized by the covariance matrix is small. By adding the magnitude of covariance matrix to the normalized distance, the state of all sample vectors attributing to a class of large variance can be avoided.

Next, by the maximum likelihood class selecting means, the class of the highest likelihood is selected, and about this class, the values of the mean vector and covariance are sequentially changed, by using the difference vector of the sample vector and mean vector, in a direction of decreasing the distance between sample classes by the class data changing means.

This action is explained below by using numerical expressions.

Supposing the coupling of luminance vector of image and two-dimensional position information vector to be feature vector (d being the number of dimensions, $d \geq 3$), where the likelihood of it belonging to a certain class is evaluated in formula (4).

$$f(x_i | u_i, \Sigma_i) = (x - u_i)^t \Sigma_i^{-1} (x - u_i) + \ln |\Sigma_i| \qquad (4)$$

where $\Sigma_i$ is covariance matrix, and $u^i$ is class mean. Formula (4) is an example of a form of adding the distance of the difference of sample vector and mean vector normalized by the covariance matrix, and the magnitude of covariance matrix, in which by obtaining the logarithm of the probability density function assuming the differential vector of x and $u_i$ to be in normal distribution, the constant portion is removed and the sign is changed. Since the position information is included in the sample vector x, the pixels for reducing the value of formula (1) are limited to the vicinity of the class mean on the image. In addition to the first term of the right side of formula (4), the logarithmic term of covariance matrix is added to the second term, and hence the problem of the class containing a sample having a large difference is avoided.

Expressing the elements of $u_i$ and $\Sigma_i$ in formula (4) to be $\sigma_{pq}(i)$ ($1 \leq p, q \leq d$), the element of inverse matrix $\Sigma_i^{-1}$ to be $\sigma'_{pq}(i)$ ($1 \leq p, q \leq n$), the p-th component of x to be $x_p$, and the p-th component of $u_i$ to be $u_p(i)$, the gradient of formula (5) about each element of covariance inverse matrix is obtained in formulas (5) and (6).

Seeing $\sigma'_{pq}(i) = \sigma'_{qp}(i)$, $\sigma_{pq}(i) = \sigma_{qp}(i)$, the Kronecker's $\delta_{pq}$ term is present.

$$\nabla_{u_i} l(x, |u_i, \Sigma_i) = \frac{-1}{\Sigma_i} (x - u_i) \quad (5)$$

$$\frac{\partial l(x, |u_i, \Sigma_i)}{\partial \sigma_{pq}'(i)} = \left(1 - \frac{\delta_{pq}}{2}\right) \{\sigma_{pq}(i) - (x_p - u_p(i))(x_q - u_q(i))\} \quad (6)$$

The relation of formula (7) is established between the element $\sigma_{pq}(i)$ of covariance matrix and the element $\sigma'_{pq}(i)$ of the inverse covariance matrix.

$$\frac{\partial \sigma_{pq}'(i)}{\partial \sigma_{pq}(i)} = \frac{(1-\delta_{pq})}{|\Sigma_i|} \frac{\partial \Sigma_{pq}(i)}{\partial \sigma_{pq}} - (2 - \delta_{pq})(\sigma_{pq}')^2 \quad (7)$$

where $\Sigma_{pq}(i)$ expresses the cofactor matrix of pq component at $\Sigma_i$.

Therefore, $\partial \Sigma_{pq}(i)/\partial \Sigma_{pq}$ is a real symmetric matrix of n-2 order.

Seeing also that the covariance matrix formula is positive semi-definite, the value of formula (7) is always negative semi-definite. Hence, there exists the delta rule of varying the class covariance in the direction of decreasing the distance shown in formula (4), by making use of the difference vector of sample vector and mean vector.

Ignoring the direction of inclination, formulas (8) and (9) are obtained.

$$\Delta u_i = \alpha(x - u_i), 0.0 \leq \alpha < 1.0 \quad (8)$$

$$\Delta \Sigma_i = -\beta(\Sigma_i - (x - u_i)(x - u_i)'), 0.0 \leq \beta 1.0 \quad (9)$$

By adding $\Delta u_i$, $\Delta \Sigma_i$ to the class mean, covariance matrix of class i regarded to be closest to the sample vector, the distance is shortened for that sample, and clustering having a small error is achieved.

In the case that teaching signal is included in clustering, according to the second embodiment of the present invention, there is teaching means for judging correctness of class data minimizing the normalized distance among combinations of class data and producing the result as output. When the teaching means correctly judges the class data minimizing the distance between sample classes, for example, $\Delta u_i$ and $\Delta \Sigma_i$ are calculated from the differential vector of, for example, the sample vector and mean vector, and by adding $\Delta u_i$, $\Delta \Sigma_i$ to the class mean and covariance matrix of class i which are regarded to be closest to the sample vector, the distance to that sample is shortened. Besides, if judged to be wrong by the teaching means, by decreasing by $\Delta u_i$, $\Delta \Sigma_i$, the distance to that sample is extended. Thus, clustering error can be reduced.

BRIEF DESCRIPTION OF THE DRAWINGS

The file of this patent contains at least one drawing executed in color. Copies of this patent with colored drawings will be provided by the Patent and Trademark Office upon request and payment of the necessary fee.

FIG. 3 is an explanatory diagram of class data change action.

FIG. 4 is a structural diagram of the second embodiment of image clustering apparatus of the invention.

FIG. 5 is an explanatory diagram of teaching information.

FIG. 6 is an operation explanatory diagram of the second embodiment.

PREFERRED EMBODIMENTS

Figure 1:
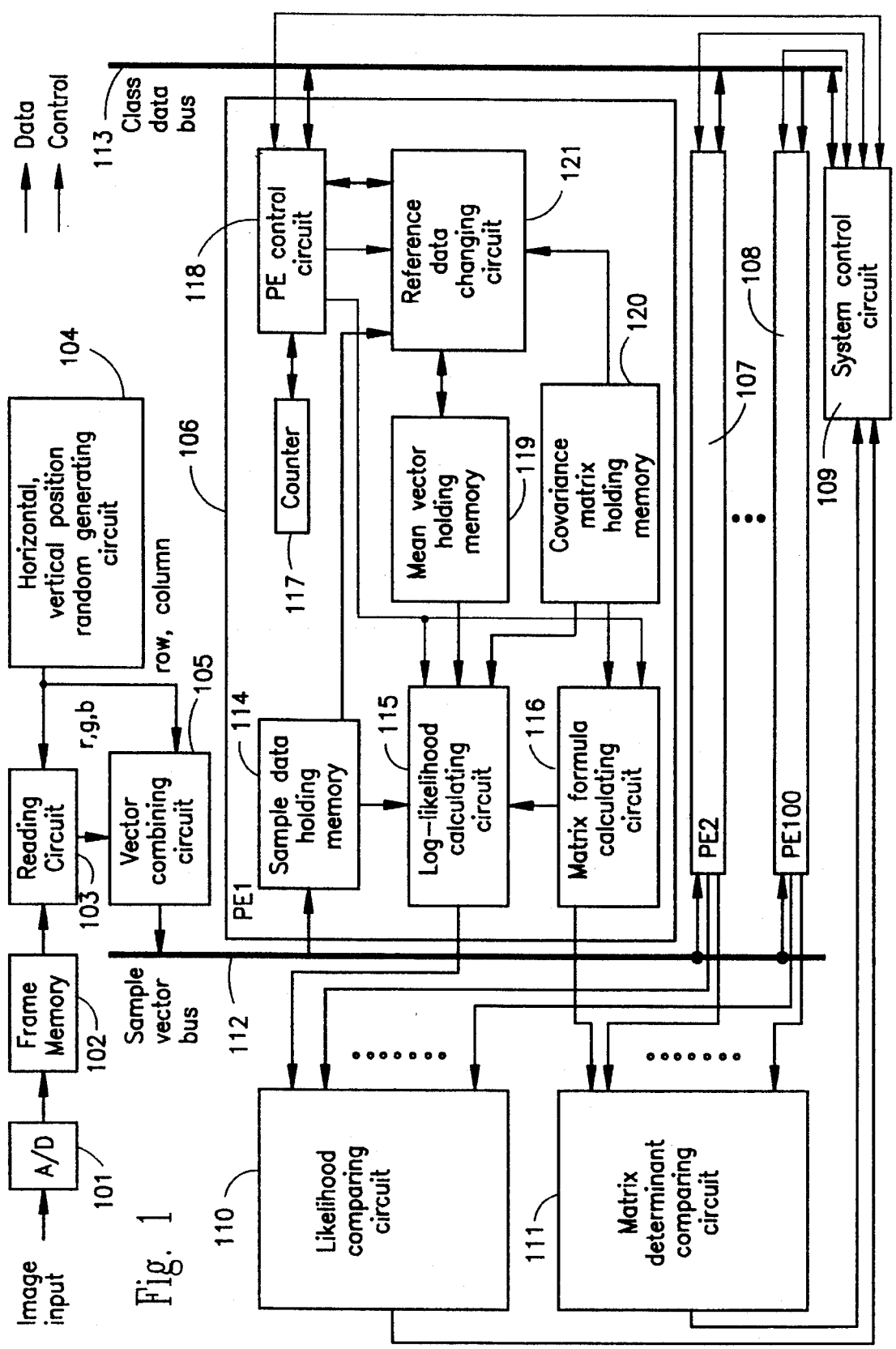
FIG. 1 is a structural diagram of the first embodiment of image clustering apparatus of the invention.
Figure 2:
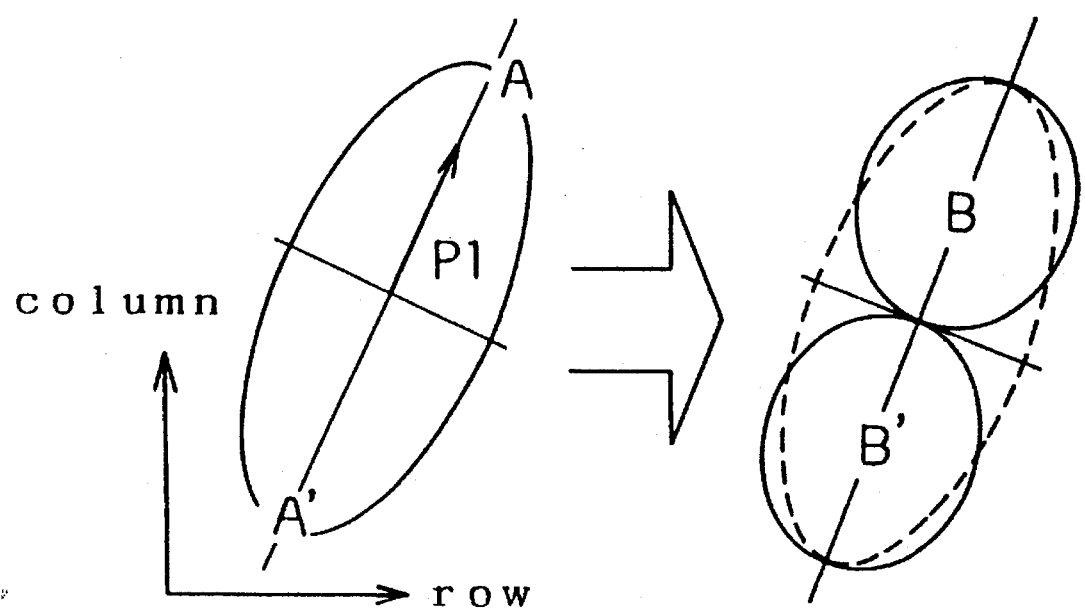
FIG. 2 is an explanatory diagram of class division.

A first embodiment of the invention is explained below. The first embodiment of the invention as claimed in claim 1 is described with reference to FIGS. 1, 2, 3. FIG. 1 is a structural diagram of an image clustering apparatus in the first embodiment, FIG. 2 is an explanatory diagram of class division, and FIG. 3 is an explanatory diagram of class data change. In this embodiment, one processing element (PE), out of 106, 107, 108, . . . , independently possess a memory for holding class data, likelihood calculating means, and class data changing means, in each class, and is composed of 100 processing elements. In FIG. 1, because the drawing size is limited, the processing elements are represented by reference numerals 106 to 108. As for the structure of the processing elements, only the structure of processing element 106 is shown. The other processing elements have the same structure. In FIG. 1, numeral 101 is an A/D converter, 102 is a frame memory, 103 is a reading circuit, 104 is a horizontal, vertical position random generating circuit, 105 is a vector combining circuit, 106 to 108 are processing elements, 110 is a likelihood comparing circuit, 111 is a matrix determinant comparing circuit, 112 is a sample vector bus, 113 is a class data bus, 114 is a sample data holding memory, 115 is a log-likelihood calculating circuit, 116 is a matrix formula calculating circuit, 120 is a covariance matrix holding memory, and 121 is a reference data changing circuit.

In the first embodiment, the apparatus' processing procedure is explained below. The video input is a color image, which is stored in the frame memory 102 through the A/D converter 101 according to the three primaries of color image, that is, red (r), green (g), and blue (b). The horizontal, vertical position random generating circuit 104 randomly generates a horizontal (row) and vertical position (column) for the image. It can be obtained as the reminder of the random number generated by arithmetic random number (for example, M series) divided by the maximum value of the row and the maximum value of the column on the image, and its constitution may be easily realized.

The reading circuit 103 reads out the feature values (r, g, b) of the pixel at the same row and column from the frame memory 102. The pixel feature values (r, g, b) are coupled by the vector combining circuit 105, and entered into the sample vector bus 112 as sample vector (R, G, B, row, column) $^t$. The sample vector as the k-th input is expressed as $X_k$. Hereinafter is explained the operation of one cycle from the input of the k-th sample vector into the sample vector bus 112 to the input of sample vector number k+1.

First the operation of the processing elements 106, 107, 108, . . . , is explained. The i-th ($1 \leq i \leq 100$) processing element holds the i-th ($1 \leq i \leq 100$) class data. The processing elements have two states, active and inactive, which is determined by reading the value of a counter 117 in the PE control circuit 118. In this embodiment, it is active when the counter value is less than a specific non-negative integer $Th_1$, and inactive after reaching the threshold $Th_1$.

The counter 117 starts from 0, and is increased by 1 every time the sample data reaches the sample holding data. The initial value of all counters is 0, and the initial state of all processing elements should be in an active state. Therefore, when $k=Th_1$, all processing elements should in an inactive state, but actually this is not so, which is described later.

The class data is composed of class mean $u_i$ and class covariance $\Sigma_i$, each being stored in the mean vector holding memory 119 and covariance matrix holding memory 120. The class covariance $\Sigma_i$ is expressed in formula (10), and it possess the covariance $C_i$ concerning color and covariance $P_i$ concerning position as diagonal components, and the distributions of color and positions are to be mutually independent.

$$\Sigma_i = \begin{pmatrix} C_i & 0 \\ 0 & P_i \end{pmatrix} \tag{10}$$

The matrix formula calculating circuit 116 reads out the covariance data from the covariance matrix holding memory 120 when the processing element is in an active state, and calculates and produces the logarithmic value $\ln |\Sigma_i|$ of the matrix formula. When in an inactive state, the output is $\ln |\Sigma_i| = 0.0$. The sample vector $x_k$ entered in the sample vector bus 112 is stored in the sample holding memory 114. The log-likelihood calculating circuit 115, when the processing element is in an active state, receives data of $x_k$, $u_i$, $\Sigma_i$, $\ln |\Sigma_i|$ from the sample holding memory 114, mean vector holding memory 119, covariance holding memory 120, and matrix formula calculating circuit, and calculates the distance $d(x_k, i)$ as shown in formula (11). In an inactive state, a numerical value (for example, a negative value) is sent out as a code indicating a particular inactive state.

$$d(x_k,i) = (x_k - u_i)^t \Sigma_i^{-i} (x_k - u_i) + \ln|\Sigma_i| \tag{11}$$

Consequently, the distance $d(x_k, i)$ is sent to the likelihood comparing circuit 110. The likelihood comparing circuit 110, issues identifier 1 which is in an active state and is minimum in the distance $d(x_k, i)$ ($1 \leq i \leq 100$). The minimum class or processing element is called a winner. The matrix determinant comparing circuit 111, receives $\ln |\Sigma_j|$ ($1 \leq j \leq 100$) from the matrix formula calculating circuit 116, and issues the identifier j, in which the logarithmic determinant is maximum, together with its value. The operation of the system control circuit 109 is shown in Table 1, and operation of PE control circuit, represented by 118, is given in Table 2.

Table 1

TABLE 1

| Condition | Operation |
| --- | --- |
| Output of likelihood comparing circuit delivers identifier 1 | "Winner signal" is sent to PE control circuit of l-th processing element, and "loser signal" to all others. |
| There is an inactive processing element m, and there is an active processing element j with $\ln|\Sigma_j| > Th_2$. | "Division signal" is sent to processing element j. "Copy signal" is sent to processing element m. |
| Sample processing number k exceeds threshold $Th_3$. | "Discard mode signal" is sent to all processing elements |

Table 2

TABLE 2

| Condition | Operation |
| --- | --- |
| Counter output is more than threshold $Th_1$ | Processing element is in inactive state |
| Discard mode received | Previously limit, thereafter processing element in discard |
| Winner signal received | Counter reset to 0 |
| Loser signal received | Counter 1 increment |
| Winner signal received and limit mode | Reference vector change circuit is updated in limit mode |
| Winner signal received and discard mode | Reference vector change circuit is updated and discard mode |
| Division signal received | Class data dividing, counter reset |
| Copy signal received | Class data copied, counter reset |

In the winner processing element, the class data is changed in the reference data change circuit. Supposing the class of identifier 1 to be winner, it is changed in formulas (12), (13).

$$u_l(k+1) = u_l(k) + \gamma r, \quad 0.0 \leq \gamma < 1.0 \tag{12}$$

$$\Sigma_l(k+1) = (1-\gamma)\Sigma_l(k) + \gamma r r^t, \quad 0.0 \leq \gamma < 1.0 \tag{13}$$

where $\gamma$ is a non-negative real number less than 1, r denotes residual, and it is a function of x, u, $\Sigma$ varying depending on the action mode. It is a vector expressed in formula (14) in limit mode, or formula (15) in discard mode.

$$\begin{cases} r(x_k, u_l(k), \Sigma_l(k)) = x_k - u_l(k) \\ \text{when } (x_k - u_l(k))^t \overset{-1}{\underset{l}{\Sigma}} (x_k - u_l(k)) < Th_4 \\ r(x_k, u_l(k), \Sigma_l(k)) = \sqrt{Th_4} \; \dfrac{x_k - u_l(k)}{w(x_k, u_l(k), \Sigma_l(k))} \\ \text{others} \end{cases} \tag{14}$$

$$\begin{cases} r(x_k, u_l(k), \Sigma_l(k)) = x_k - u_l(k) \\ \text{when } (x_k - u_l(k))^t \overset{-1}{\underset{l}{\Sigma}} (x_k - u_l(k)) < Th_4 \\ r(x_k, u_l(k), \Sigma_l(k)) = 0 \\ \text{others} \end{cases} \tag{15}$$

Accordingly, in the case of the sample vector of which residual error is large in discard mode, the class data is not changed. In limit mode, the class data is changed, but the residual error is changed into a vector of which Mahalanobis distance is $Th_4$. In formula (14), w is expressed in formula (16).

$$w(x_k, u_l(k), \Sigma_l(k)) = \sqrt{(x_k - u_l(k))^t \sum_{l}^{-1} (x_k - u_l(k))} \quad (16)$$

This ends one cycle about the k-th sample vector input.

Before getting into cycle k+1, if it is possible to divide the class data, it is done. According to Tables 1 and 2, the class maximum in the matrix formula logarithmic value is always selected by the matrix determinant comparing circuit 111, and when it is greater than the specific threshold $Th_2$, it is always subject to division. If there is an inactive class, division action and copy action are affected in the reference data change circuit. Supposing the identifier of the class to be divided to be j and the identifier of the inactive class to be m, in the processing element of class j to be divided, two class means $u_j^+$, $u_j^+$ and covariance matrix $\Sigma_j'$ are calculated by using the reference data change circuit 121. In the processing element, j, the mean $u_j^+$ and covariance matrix $\Sigma_j'$ are updated to the own class data, while the mean $u_j^-$ and covariance matrix $\Sigma_j'$ are issued to the class data bus 113. In the processing element m, reading $u_j^-$ and covariance matrix $\Sigma_j'$, new class data is obtained. At this time, the counters of both processing elements are reset to 0. This operation is expressed in formulas (17), (18), (19).

$$u_j^+ = u_j + \sqrt{\lambda_{j1}} \ P_{j1} \quad (17)$$

$$u_j^- = u_j + \sqrt{\lambda_{j1}} \ P_{j1} \quad (18)$$

$$\Sigma_j' = \begin{pmatrix} c_j & 0 \\ 0 & p_j' \end{pmatrix}, \Sigma_j' = \Sigma_j - \frac{3}{4} \ P_1 P_1^t P_j' = P_j - \frac{3}{4} \ \lambda_{j1} P_{j1} P_{j1}^t \quad (19)$$

In the covariance matrix, since the variances of position and color are independent as shown in formula (10), there are two eigenvectors independent of color. In formulas (17), (18), $\lambda_{j1}$ and $P_{j1}$ are the eigenvalue and eigenvector of the covariance matrix $P_j$ relating to the position, which are shown in formula (20).

$$P_j = \lambda_{j1} P_{j1} P_{j1}^t + \lambda_{j2} P_{j2} P_{j2}^t, |P_{j1}| = |P_{j2}| = 1, \lambda_{j1} \leq \lambda_{j2} \quad (20)$$

The meaning of formulas (17), (18) is explained by referring to FIG. 2. In FIG. 2, on the left, the eigen vector $P_{j1}$ is shown.

Considering the covariance of the position in the ellipse distributing uniformly, the major axis is parallel to $P_{j1}$ and its radius is the square of the first eigen value. Herein, the division position of the class data is obtained as vector positions B, B' divided in two sections in the direction of major axis of the equivalent ellipse. Accordingly, the radius of the major axis of the equivalent ellipse is divided in two sections, so that the corresponding eigen value is ¼.

The explanation of the threshold value used in this embodiment is given by reference to Table 3.

TABLE 3

| Threshold | Meaning |
| --- | --- |
| $Th_1$ | Period for maintaining the processing element active state. Changed to inactive state if winner signal is not received in this period. |
| $Th_2$ | Determination of division of class data large in covariance. |
| $Th_3$ | Determination of transition to discard mode of class data change action |
| $Th_4$ | Determination of critical region of sample vector |

In this embodiment, when the value of the counter of identifier 1 that is the winner is reset to 0, the active state is held for at least $Th_1$ cycle. The class not becoming winner in the $Th_1$ cycle falls in an inactive state. As a result, it is possible to cope with image changes due to elimination of the subject or the like.

$Th_2$ determines the magnitude of the cluster to be divided. Hence, it is possible to cope with image changes such as the appearance of a new subject on the image.

$Th_3$ and $Th_4$ contribute greatly to stability of clustering. This is explained by reference to FIG. 3. In FIG. 3, however, for the ease of understanding, it is shown as if the distribution of sample were two-dimensional, but it is actually five-dimensional in the embodiment.

Supposing the difference of the sample vector and class mean to be normal distribution, the Mahalanobis distance of normalizing it by covariance is a $\chi$-square distribution with the degree of freedom of five. For example, assuming $Th_4$= 15.09, 99% of sample vectors fall within the threshold. The left side of FIG. 3 denotes the boundary expressed by this threshold as the $\chi$-square distribution critical region boundary. In clustering, as shown in FIG. 3, winning the sample vector outside the critical region boundary, the data may be changed.

At this time, when the class mean or covariance is changed by using the residual error not limited at all, it may be a large effect on the few sample vectors with large residual error, and the clustering result is not stable. By contrast, in this embodiment, first by limit mode, the sensitivity is lowered to the sample vector with large residual error, and clustering is performed. In the discard mode, eliminating the effects of few sample vectors with large residual error, the class mean and covariance are determined. The limit mode is placed before the discard mode because the clustering result may not express the entire image in the discard mode since the class data is not changed at all in the sample vectors other than the critical region boundary. Therefore, after the $Th_3$ cycle limit mode, the discard mode is put in action.

According to this embodiment, clustering with a variable number of classes can be effected at high speed by the introduction and control of the active state. When intended to enhance the convergence of clustering, by taking a large value for $\gamma$, the convergence speed is increased, but the stability becomes poor. Regarding this point, in this embodiment, stability is achieved by limiting or discarding the large difference. Both setting of the critical region and estimation of covariance matrix are done, and automatic setting is a feature. Although $\gamma$ is a constant in the embodiment, it may be a function of time or covariance.

Figure 7:
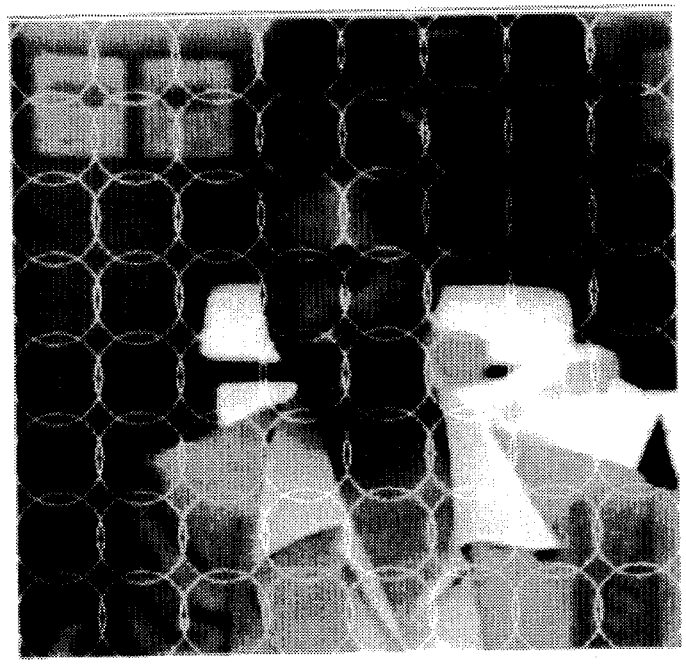
FIG. 7 is a diagram showing operation result and initial image in the second embodiment.
Figure 8:
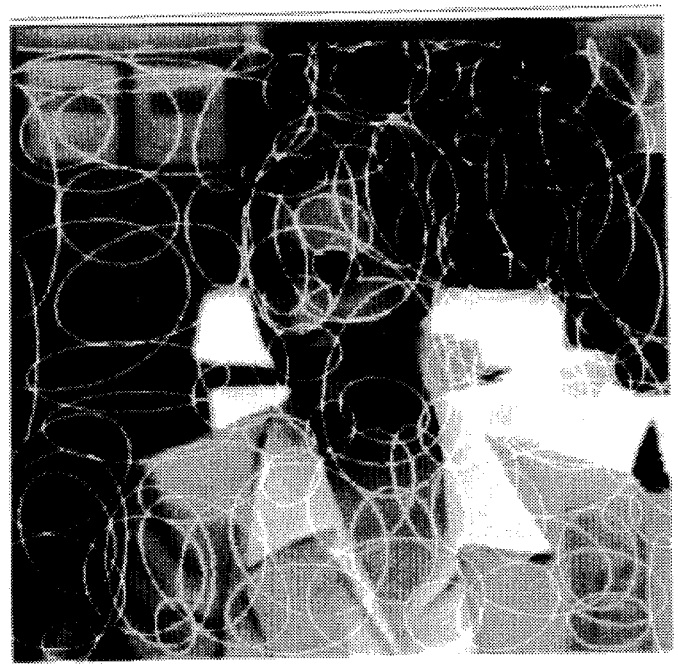
FIG. 8 is a diagram showing operation result and processing result in the second embodiment.
Figure 9:
FIG. 9 is a diagram showing operation result and result of application in dividing of the second embodiment.

Next is explained the second embodiment of the invention by referring to the drawings. The second embodiment as claimed in claim 2 is explained by reference to FIGS. 4, 5, 6, 7, 8, 9. FIG. 4 is a structural diagram of an image clustering apparatus in the first embodiment, FIGS. 5, 6 are explanatory diagrams of teaching information, and FIGS. 7, 8, 9 are experiment results. In FIG. 4, numeral 201 is an A/D converter, 202 is a frame memory, 203 is a reading circuit, 204 is a horizontal, vertical position random generating circuit, 205 is a vector combining circuit, 206 to 208 are processing elements, 210 is a likelihood comparing circuit, 211 is a matrix formula comparing circuit, 212 is a sample vector bus, 213 is a class data bus, 214 is a sample data holding memory, 215 is a log-likelihood calculating circuit, 216 is a matrix formula calculating circuit, 220 is a covariance matrix holding memory, 221 is a reference data changing circuit, 222 is a writing circuit, 223 is a mask memory, and 224 is a reading circuit.

The constitution of this embodiment shares much with the first embodiment, and only the differences are explained. In the second embodiment, of the constitution shown in the first embodiment, the operation of the system control circuit 109, PE control circuit 118, and reference data changing circuit 121 is partly changed.

In addition to the change of action shown above, the writing circuit 222 for giving the teaching information, the mask memory 223 for holding it, and the reading circuit 224 for transmitting it to the processing element are added.

Thus in the second embodiment, the processing procedure is explained as follows. In this embodiment, the teaching information is given so that the class may belong to two groups. This is shown in FIG. 5. The region of the image is roughly enclosed by the outline $ID_2$, and the identifier outside the region is 0, the identifier in the region is 1, and other uncertain regions are 2, and they are stored in the mask memory 223 as mask pattern through the writing circuit 222. This is the teaching information.

In the first embodiment, the reference changing circuit 121 changed the sample vector according to formulas (12), (13) when the processing element becomes winner. Let us call it positive changing action. In the reference changing circuit 221, by contrast, when the sample vector when the processing element is winner is a sample vector in a wrong region, $\gamma$ ($0.0 \leq \gamma 1.0$) in formulas (12), (13) of class data change is used by changing over its polarity sign. This is called negative change action.

This is the action newly added to the reference changing circuit 221.

At the beginning of clustering action, the system control circuit 209 gives the region identifier 0 or 1, depending on the initial position of the mean vector of each processing element. In the second embodiment, this action is added to the system control circuit 109 in the first embodiment. The PE control circuit 218 holds the region identifier given from the system control circuit.

Consequently, same as in the first embodiment, the image data is read out by the horizontal and vertical position random generating circuit 204, and at the same time, the region identifier is read out from the reading circuit 224. This identifier is available in three types, 0, 1, 2, and is sent to the PE control circuit 218. In the PE control circuit 218, by comparing the given identifier and the output of the reading circuit 224, it is judged to be correct or wrong. When a winner signal is sent, the corresponding processing element actuates the reference changing circuit 121, but when the output identifier from the PE control circuit 218 is 2, it is controlled not to correct. Or, when the held region identifier and the output identifier of the PE control circuit 218 are matched, exactly same as in the first embodiment, it is controlled to effect the positive change action through the reference changing circuit 221. Otherwise, assuming the wrong sample vector to be winner, it is controlled to effect the negative change control in the reference changing circuit 221. When a division signal is received, in addition to the conventional class data, the held region identifier is also issued to the class data bus 213. When a copy signal is received, reading in through the class data bus 213, the region identifier is also copied and held. This is the changed point of the PE control circuit 218.

This embodiment is intended to compose the class data so as to conform to the mask pattern regarding the region division. For example, as shown in FIG. 6, if the region of the region identifier 0 is composed of regions of black, blue and gray, the class mean and covariance may be determined accordingly.

The operation results of the second embodiment are shown in FIGS. 7, 8, 9. FIG. 7 shows the initial value of clustering action. From the initial value of class data, the mean of position is shown, and the circles in the diagram indicate an equivalent ellipse explained in FIG. 2 from covariance. There are 64 classes in an inactive state. As the training data, it is 1 in the human figure, 0 outside the figure, and 2 in the boundary. The processing result after 30,000 random samplings is given in FIG. 8. As the intersecting ellipses, the result of clustering is obtained. The number of classes is increased to 100 at maximum as a result of division. To illustrate the performance of the result shown in FIG. 8, an after-processing result is given in FIG. 9. This is to show the image having the region identifier of 0 in the class of the shortest distance (that is, within the human figure) by completely scanning the image and finding the sample vector. In spite of a slight error, the region can be separated by the clustering shown in the embodiment.

According to the invention, as compared with the conventional image clustering apparatus, classification of pixels in the image changing and updating data rapidly and stably, the mean of the classes, and covariance are obtained. In particular, since the covariance is included in the class data, sound clustering is possible on the deviated values of sample data. The first invention relates to the self-organization without teaching information, in which pixels having similarity in color position can be clustered in the image. This can be applied in tracing of object, coding, and evaluation of similarity.

The second invention relates to categorical learning with teaching information, in which the given image region segmentation can be expressed by classes. It can be applied in segmentation of region or initialization of tracking. Thus, the practical effects are great in the image processing of the invention.

What is claimed is:

1. An image clustering apparatus which changes sample class data representative of a selected sample class in response to reading of a new sample vector, the sample class data representative of the selected sample class including covariance matrix data and mean vector data, said apparatus changing the sample class data representative of the selected sample class to provide changed sample class data, said apparatus comprising:

(a) a frame memory for storing an image represented by coded pixels, (b) reading means for reading out, from the frame memory, values associated with a pixel at a random horizontal and vertical position on the image, and generating a new sample vector that includes the read out values and horizontal and vertical position data corresponding to the pixel at the random position, (c) a memory means for holding a plurality of sets of sample class data representing sample classes, the sample class data including covariance matrix data and mean vector data derived from sample vectors, (d) likelihood calculating means for determining a likelihood that the new sample vector generated by said reading means is included in one of the plural sets of sample classes based on distances between the new sample vector and the sample classes, the distances each being a sum of:

a distance value obtained by determining a difference vector indicative of the difference between the new sample vector and the class data mean vector, and normalizing the difference vector by the covariance matrix, and the magnitude of the covariance matrix, (e) maximum likelihood class selecting means for selecting a selected sample class from among the sample classes represented by the sample class data sets in said memory, the selected sample class having a minimum distance from the new sample vector, and (f) class data changing means for changing the mean vector data and the covariance matrix data of the class data representative of the selected sample class to provide the changed sample class data for said sample data holding memory, said changing means providing the changed sample class data such that the distance between the selected sample class and the new sample vector is reduced by using the difference vector.

2. An image clustering apparatus comprising:

(a) a frame memory for storing an image represented by coded pixels, (b) reading means for reading out, from the frame memory, values associated with a pixel at a random horizontal and vertical position on the image, and generating a new sample vector that includes the read out values and horizontal and vertical position data corresponding to the pixel at the random position, (c) a memory for holding a plurality of sets of sample class data representing sample classes, the sample class data including covariance matrix data and mean vector data derived from sample vectors, (d) likelihood calculating means for determining a likelihood that the new sample vector is included in one of the plural sets of sample classes based on distances between the new sample vector and the sample classes, the distances each being a sum of:

a distance value obtained by determining a difference vector indicative of the difference between the new sample vector and the class data mean vector, and normalizing the difference vector by the covariance matrix, and the magnitude of the covariance matrix, (e) maximum likelihood class selecting means for selecting a sample class with a minimum distance from the new sample vector from among the sample classes to provide a selected sample class, (f) teaching means for determining whether the sample class selected by the maximum likelihood class selecting means is within a predetermined region within said image, and (g) class data changing means for changing the mean vector and covariance matrix of the selected sample class after comparison with the new sample vector so as to reduce the distance between the selected sample class and the new sample vector, when the selected sample class is determined to be within the predetermined region by the teaching means, and changing the mean vector and the covariance matrix of the selected sample class so as to increase the distance between the selected sample class and the new sample vector by using the difference vector, when the selected sample class is determined to be outside the predetermined region by the teaching means.

3. The image clustering apparatus as claimed in claim 2 further comprising:

a writing circuit for providing an indicator associated with said predetermined region;

a mask memory for storing an indicator received from said writing circuit; and a reading circuit for reading an indicator stored in said mask memory and transmitting the indicator to the teaching means.

* * * * *